United States Patent [19]
Jung et al.

[11] Patent Number: 5,954,774
[45] Date of Patent: Sep. 21, 1999

[54] METHOD FOR CONTROLLING REAR WHEEL STEERING ANGLE OF A VEHICULAR 4-WHEEL STEERING SYSTEM

[75] Inventors: Yon-Ku Jung, Seoul; Un-Sung Chang, Kyoungki-Do, both of Rep. of Korea

[73] Assignee: Kia Motors Corporation, Seoul, Rep. of Korea

[21] Appl. No.: 08/699,313

[22] Filed: Aug. 19, 1996

[30] Foreign Application Priority Data

Jul. 11, 1996 [KR] Rep. of Korea ................. 96-28007

[51] Int. Cl.$^6$ ........................................ B62D 5/04
[52] U.S. Cl. ...................... 701/41; 280/91.1; 180/412; 180/445
[58] Field of Search ................. 701/41, 42; 180/408, 180/409, 412, 415, 410, 421, 422, 445; 280/91.1

[56] References Cited

U.S. PATENT DOCUMENTS

| | | |
|---|---|---|
| 4,695,068 | 9/1987 | Kawamoto et al. ............ 180/409 |
| 5,019,982 | 5/1991 | Furukawa ........................ 701/41 |
| 5,088,573 | 2/1992 | Moll .............................. 180/415 |
| 5,099,940 | 3/1992 | Imaseki et al. ................. 701/41 |
| 5,150,764 | 9/1992 | Eguchi et al. .................. 701/42 |
| 5,521,820 | 5/1996 | Wakamatsu et al. ........... 180/412 |

*Primary Examiner*—Gary Chin

[57] ABSTRACT

Disclosed is a method for controlling a rear wheel angle of a four-wheel steering system for a vehicle, including the steps of: setting a control cycle of an actuator; dividing the control cycle into an accelerating section, a uniform velocity section, and a reduction section according to a rotating velocity of the actuator; integrating each section according to the rotating velocity of the actuator; calculating a desired rear wheel angle according to a practical rear wheel angle measured under each integral equation of each section; and executing, during the control cycle, a compensating control with respect to an error value calculated by comparing the practical rear wheel angle and the desired rear wheel angle with each other.

2 Claims, 10 Drawing Sheets

PRACTICAL REAR WHEEL ANGLE

STEERING VELOCITY OF PRACTICAL REAR WHEEL ANGLE

METHOD FOR CONTROLLING REAR WHEEL STEERING ANGLE OF A VEHICULAR 4-WHEEL STEERING SYSTEM

FIELD OF THE INVENTION

The present invention relates to a method for controlling a rear wheel steering angle of a vehicular 4-wheel steering system and, more particularly, to a method for controlling a rear wheel steering angle in response to both a front wheel steering angle and vehicle velocity.

BACKGROUND OF THE INVENTION

A conventional steering system for a vehicle generally comprises a handling mechanism consisting of a steering wheel; a steering shaft and a column; a gear mechanism consisting of a steering gear mounted on a frame and a link; and a link mechanism consisting of a pitman arm, a drag link and a tie rod.

Such steering systems are designed to adjust the directional orientation of front wheels by gearing the tie rod to the left or right in response to the rotating direction of the gear installed at the end of the steering shaft.

However, since the steering systems are designed so that only the front wheels are steered, the vehicle body is inclined suddenly and unstable during high speed turns.

Accordingly, 4-wheel steering systems which can steer the front wheels and the rear wheels simultaneously have been recently developed.

As shown in FIG. 1, the front and rear wheels generally maintain a counter-phase angle below a predetermined velocity range of about 40–60 km/h to improve handling ability at lower speeds while maintaining the same-phase above the predetermined velocity range to improve driving ability at higher speeds.

In earlier developments of the 4-wheel steering system, the system was designed such that the steering force was transmitted by a hydraulic system. In recent years, however, the steering force is transmitted with an actuating motor to simplify the structure and improve controllability.

FIG. 2 shows a conventional 4-wheel steering system using the actuating motor. The motor 1 is controlled by an electronic control unit ("ECU") to which information relating to front wheel angle and vehicle speed is inputted at all times. A timing belt 2 is connected to a shaft 11 of the motor 1. The timing belt 2 is further connected to a pulley (not shown). The pulley is provided with a screw groove on its inner circumference. A ball screw 3 is screwed into the screw groove such that the rotary motion of the motor 1 can be converted into a linear motion of the ball screw 3. One end of the ball screw 3 is pivotally coupled with one end of a link 4. The other end of the link 4 is fixed to one end of a tie-rod 5, the other end of which is fixed to a rear wheel 6. In addition, a compression spring 7 is mounted on the other side of the ball screw 3 to provide dynamic stability to the ball screw 3 such that the spring can align the rear wheel 6 in the same direction as that of the longitudinal direction of the vehicle when the power of the motor 1 cannot be transmitted to the rear wheel 6.

The operation of the above-described 4-wheel steering system will be described hereinafter with reference to FIG. 3.

When the front wheel angle is determined by manipulation of the steering wheel, both the front wheel angle and the current vehicle speed are inputted into an operation part 20 of the ECU. A desired rear wheel angle is then determined by the operation part 20. This desired rear wheel angle is transmitted to a controller 21 which generates a control signal that is amplified by an amplifier 22, to drive the motor 1.

Accordingly, the shaft 11 of the motor 1 rotates in a predetermined number of rotations. This rotating force is transmitted to the ball screw 3 through the timing belt 2, thereby linearly moving the ball screw 3. Therefore, the tie rod is pushed or pulled by the link 4 which is linearly moved in response to the linear movement of the ball screw 3 to steer the rear wheel.

At this point, when the practical steered angle of the rear wheel is measured, this steered angle is compared with the desired rear wheel angle. If there is difference between the angles, the differential value is compensated by the controller 21 such that the practical steered angle becomes the same as the desired rear wheel angle.

Accordingly, to achieve the above described feedback, the practical (or actual) rear wheel angle must be measured. A well-known method for measuring the rear wheel angle is a combination method utilizing an encoder method and a potentiometer method.

According to the encoder method, the rear wheel angle or rotating angle of the motor 1 is measure by a pulse signal. Although this method can obtain an exact measured value, there are shortcomings in that both a special compensating algorithm for converting the pulse signal into an angle, and an algorithm for converting a relative rear wheel angle into an absolute rear wheel angle, are required. According to the potentiometer method, a resistance value is measured in accordance with a voltage value, and an absolute value of the rear wheel angle is directly measured from the resistance value. Therefore, since a special compensating algorithm is not required, the measurement of the rear wheel angle can be quickly achieved. The degree of precision, however, is reduced due to current noise when applying voltage.

Accordingly, as described above, a combination method of the encoder and the potentiometer method has been used so that mutual compensation can be achieved. Namely, the potentiometer is used for measuring the rear wheel angle in short time, and the encoder method is used for compensating the error of the potentiometer method and controlling an initial setting.

In the above-described rear wheel controlling method, the rear wheel angle is controlled by a point-to-point method on the basis of a frame time.

To further explain, when both a rear wheel angle and a vehicle speed are inputted into the ECU thereby calculate a desired rear wheel angle, a feedback control is performed by a controller to compensate for an error value. The error value is the difference between the desired rear wheel angle and the practical rear wheel angle. At this point, the point-to-point method is used, in which the frame time which is a control cycle is set at about 10 m/s. The rear wheel is controlled by a constant desired rear wheel angle during a special single cycle. After this special cycle, the rear wheel is controlled by a newly-calculated desired rear wheel angle.

However, in a rear wheel control device of the 4-wheel steering system, when the device malfunctions, a gain value of the controller should be increased to allow the controller to have strength against external conditions such as a direction change of a compression spring for returning the rear wheel to a neutral position and an external force change caused by the rear wheel. To enable the controller to read the error value and control it, a certain value should be multiplied to an error value. The certain value is the gain value.

The direction of the compression spring will be described more in detail hereinafter. When the rear wheel is steered from a neutral position, the biasing force of the spring acts in a direction restraining the steering operation. However, when the rear wheel is returned to the neutral position, the biasing force of the spring acts in a direction urging the return of the rear wheel.

However, in the conventional point-to-point method, since the gain value is constant regardless of a direction of the pre-pressure spring, a response value of the actuating motor, with respect to a signal generated from the controller, becomes too small when the pre-pressure spring acts in a direction restraining the steering operation. When the pre-pressure spring acts in a direction urging the return of the rear wheel, the response value becomes too large.

When increasing the gain value, the problems of the former can be solved. However, in case of the latter, since the response value of the actuator is further increased, an over-shoot phenomenon occurs. On the other hand, when decreasing the gain value, responsiveness is deteriorated.

SUMMARY OF THE INVENTION

It is an object of the present invention to provide a method for controlling a rear wheel angle of a 4-wheel steering system in which the practical rear wheel angle is not controlled by only one fixed desired rear wheel angle that is set during the control cycle, but continuously controlled by a desired rear wheel angle which is constantly varied according to time.

To achieve the above object, the present invention provides a method for controlling a rear wheel angle of a four-wheel steering system for a vehicle, comprising the steps of:

setting a control cycle of an actuator;

dividing the control cycle into an accelerating section, a uniform velocity section, and a reduction section according to rotation speed of the actuator;

integrating each section according to the rotation speed of the actuator;

calculating a desired rear wheel angle according to a practical rear wheel angle measured under each integral equation of each section; and executing, during the control cycle, a compensating control with respect to an error value calculated by comparing the practical rear wheel angle and the desired rear wheel angle with each other.

Preferably, each desired rear wheel angle at each section is calculated using the following equations:

in a section from an initial control to the accelerating section;

$$q = q_{0r} + (\tfrac{1}{2})at_2 \quad (1)$$

in a section from the initial control to the uniform velocity section;

$$q = q_{0r} + (\tfrac{1}{2})bt + (t-t_1)b \quad (2)$$

in a section from the initial control to the reduction section;

$$q = q_{0r} + bt_2 - (a/2)(t_3 - t_2) \quad (3)$$

wherein, q=the desired rear wheel angle $q_{0r}$=a practical rear wheel angle calculated at the initial control a=acceleration at the accelerating section b=a uniform velocity at the uniform velocity section t1=time from the initial control to the accelerating section

BRIEF DESCRIPTION OF THE DRAWINGS

These and other features, aspects, and advantages of the present invention will become better understood with regard to the following description, appended claims, and accompanying drawings wherein:

FIGS. 4 and 5 are graphs of an algorithm of a rear wheel steering angle control method using a control of a velocity trajectory of an actuator in accordance with the present invention, wherein FIG. 4 is a graph illustrating the steering velocity of the actuator with respect to a control cycle and FIG. 5 is a graph illustrating an integral state of the rotating velocity at each section depicted in FIG. 4;

FIGS. 9 to 12 are graphs comparing responsiveness of the actuator between a conventional point-to-point method and a trajectory control method in accordance with the present invention, wherein FIG. 9 is a graph illustrating a practical rear wheel angle with respect to time, FIG. 10 is a graph illustrating a practical rear wheel angle steering velocity with respect to time, FIG. 11 is a graph illustrating a current input state with respect to time, and FIG. 12 is a graph illustrating a practical rear wheel angle error value with respect to time; FIG. 13 is a graph illustrating a desired rear wheel angle with respect to time, FIG. 14 is a graph illustrating a desired rear wheel angle steering velocity with respect to time, FIG. 15 is a graph illustrating a desired rear wheel angle responding value with respect to time, FIG. 16 is a graph illustrating a desired rear wheel angle steering velocity responding value with respect to time, FIG. 17 is a graph illustrating a desired rear wheel angle error value with respect to time, and FIG. 18 is a graph illustrating a current input state of a desired rear wheel angle with respect to time.

DETAILED DESCRIPTION OF THE PREFERRED EMBODIMENT

Reference will now be made in detail to the present preferred embodiment of the invention, an example of which is illustrated in the accompanying drawings.

Figure 1:
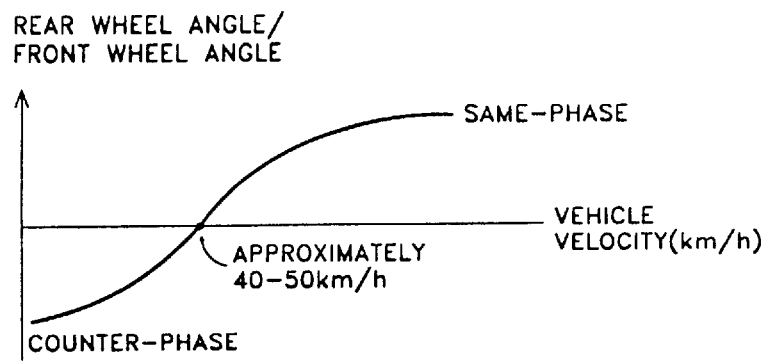
FIG. 1 is a graphical illustration showing a rear wheel angle curve with respect to different vehicle speeds in accordance with a conventional 4-wheel steering system.
Figure 2:
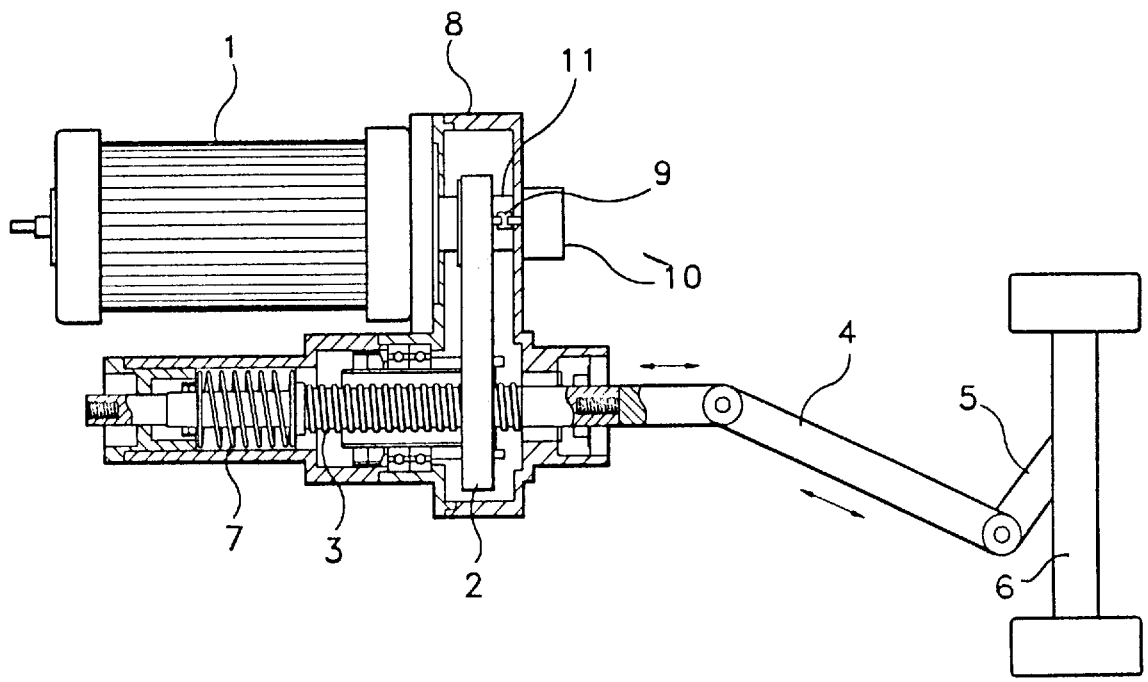
FIG. 2 is a schematic view illustrating a conventional 4-wheel steering system.
Figure 3:
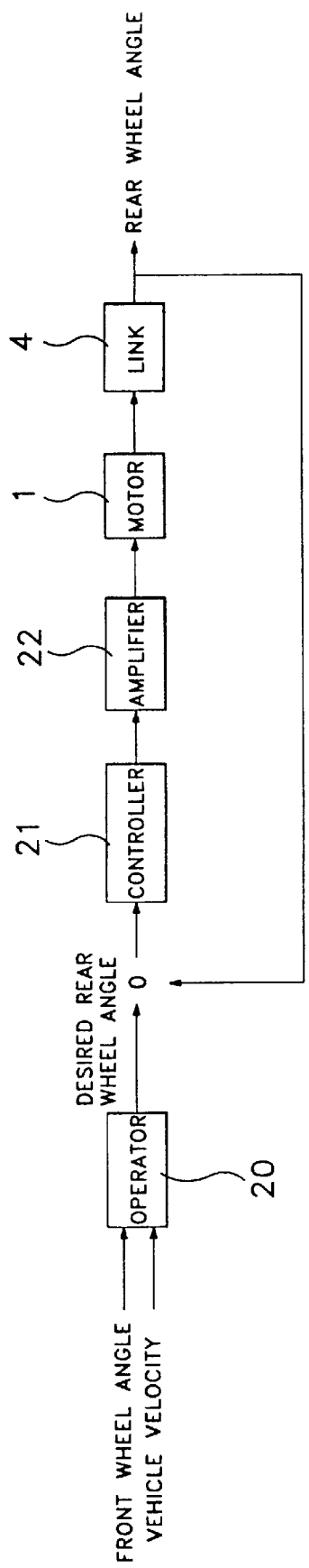
FIG. 3 is a control block diagram of a conventional 4-wheel steering system.
Figure 4:
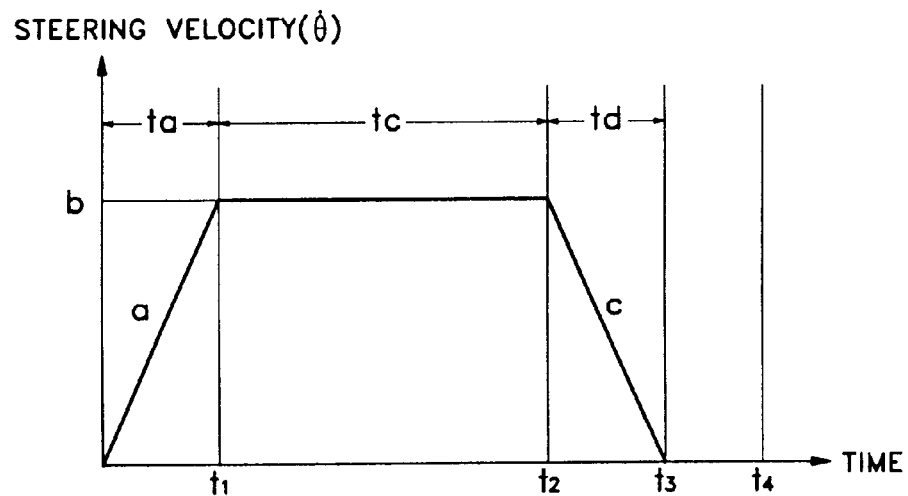

According to the present invention, a control cycle is divided into three sections, namely, an accelerating section, a uniform velocity section and a reduction section according to a rotating velocity of an actuator. As shown in FIG. 4, in a section $t_a$, the rotating velocity is accelerated by acceleration a, in a section $t_b$, the velocity is maintained at the highest velocity b, and in a section $t_c$, the velocity is reduced by a reduction velocity c.

Figure 5:
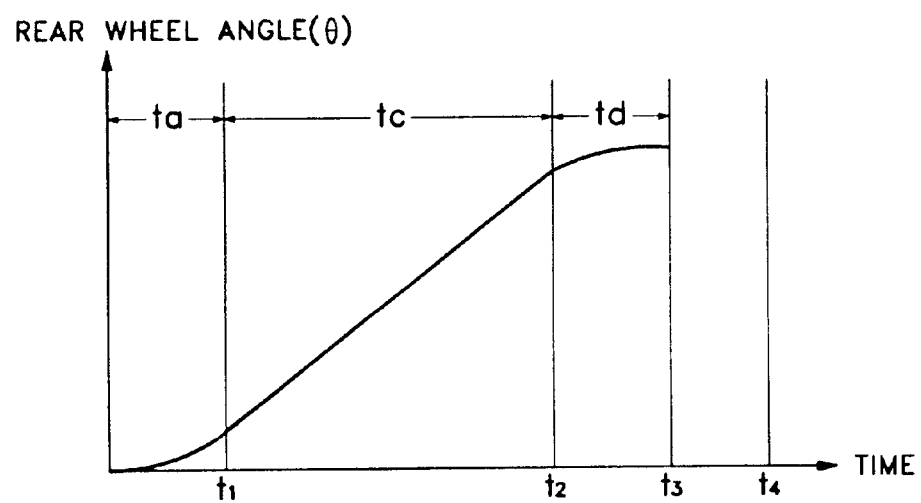
Figure 6:
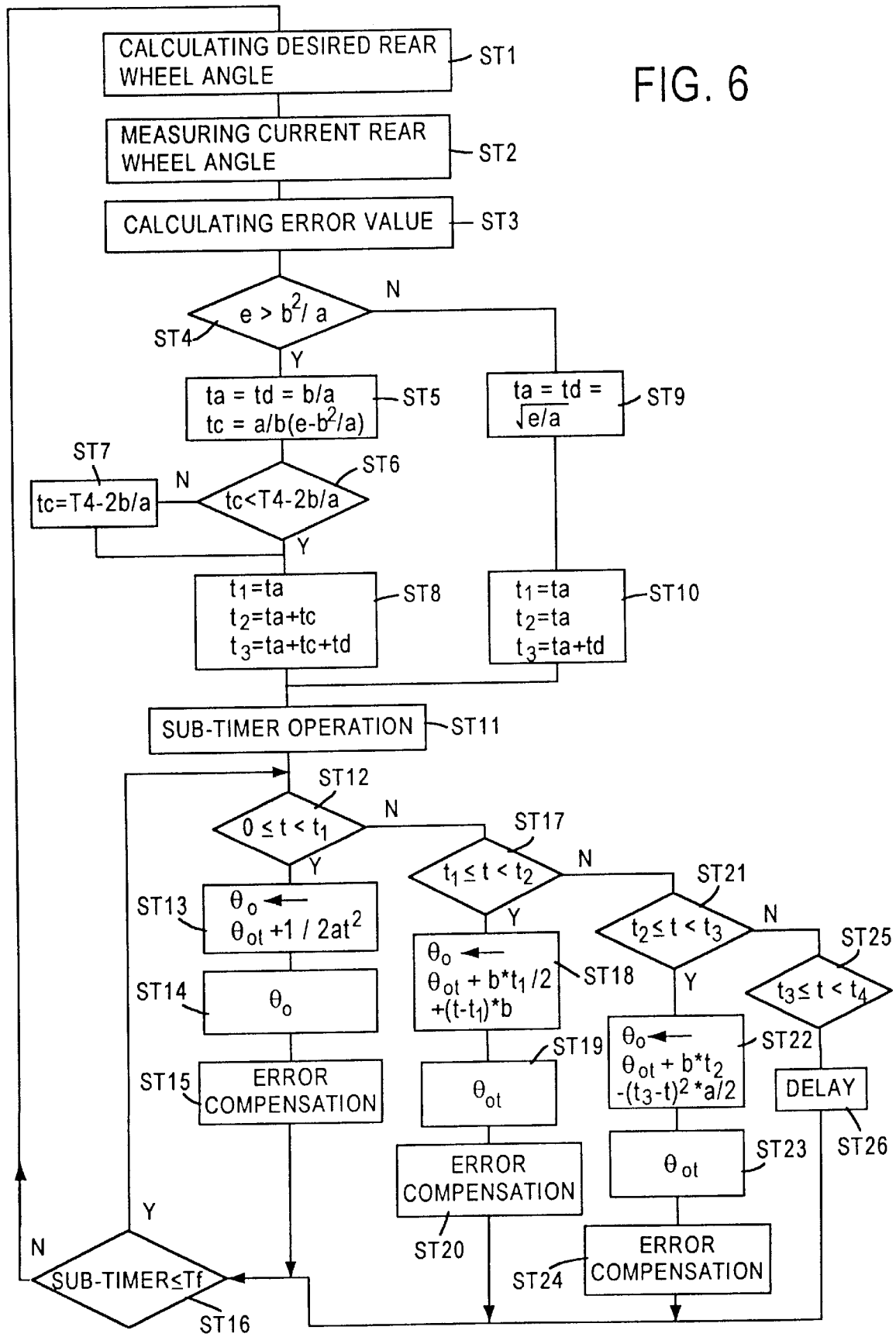
FIG. 6 is a flowchart illustrating the rear wheel angle control method in accordance with the present invention.

After dividing the control cycle as described above, when integrating each section, as shown in FIG. 5, an integral curve with respect to a practical rear wheel angle, which is a rotating angle of the actuator q, is obtained.

In addition, time from an initial control to the accelerating section $t_a$ is set as $t_1$, and time from the initial control to the uniform velocity section $t_b$, that is, $t_a+t_b$ is set as $t_2$, and time from the initial control to the reduction section $t_c$, that is, $t_a+t_b+t_c$ is set as $t_3$.

Accordingly, integration equations at each section can be expressed as follows:

(i) $t_1$ section $$q = q_{0r} + (\tfrac{1}{2})at_2 \qquad (1)$$

(ii) $t_2$ section $$q = q_{0r} + (\tfrac{1}{2})bt + (t-t_1)b \qquad (2)$$

(iii) $t_3$ section $$q = q_{0r} + bt_2 - (a/2)(t_3 - t_2) \qquad (3)$$

where, the $q_{0r}$ is a measured practical rear wheel angle.

After constituting an algorithm of a controller in accordance with a rotating velocity trajectory of the actuator as described above, the control process can be described with reference to FIG. 5 as follows:

(1) Step ST1

Both a front wheel angle and a desired rear wheel angle $q_r$ in response to current vehicle velocity are calculated.

(2) Step ST2

A practical rear wheel angle $q_{0r}$ by the operation of the actuator is measured in accordance with the above-described potentiometer method.

(3) Step ST3

The desired rear wheel angle $q_r$ and the measured practical rear wheel angle $q_{0r}$ are compared with each other and thereby an error value e is calculated.

(4) Step ST4

To determine if the uniform velocity section exists during the control section $t_4$, the error value is compared with a value obtained by dividing the square of the highest velocity b by an accelerating velocity a or reduction velocity c.

(5) Step ST5

If the error value e is larger than the value, this means that the uniform velocity section $t_b$ exists. Namely, the rotating velocity of the actuator varies as shown in FIG. 4. Therefore, both the accelerating section $t_a$ and the reduction section $t_c$ become a value obtained by dividing the highest velocity(b) by the accelerating velocity(a), and the velocity section is determined by the following equation:

$$t_b = (e - b^2/a)b$$

(6) Step ST6

Time $t_4$ of the control cycle is compared with time obtained by adding accelerating time $t_a$, uniform velocity time $t_b$ and reduction time $t_c$ with each other.

(7) Step ST7

If the time $(t_a+t_b+t_c)$ is longer than the time $t_4$ of the control cycle, the uniform velocity section can be determined in accordance with the following equation:

$$t_c = t_4 - 2b/a$$

(8) Step ST8

After completing the comparison of time at each section with the control time $t_4$, time from the initial control to the accelerating section $t_a$ is set as $t_1$, time from the initial control to the uniform velocity section is set as $t_2$, and time from the initial control to the reduction section $t_c$ is set as $t_3$ as following:

$$t_1 = t_a$$

$$t_2 = t_a + t_b$$

$$t_3 = t_a + t_b + t_c$$

(9) Step ST9

If, in the step ST4, the error value is smaller than $b_2/a$, since this means uniform velocity section does not exist, both the accelerating section $t_a$ and the reduction section $t_c$ are set as $(e/a)_{1/2}$ without the uniform velocity section.

(10) Step ST10

Therefore, both $t_1$ and $t_2$ become $t_a$, and $t_3$ becomes $(t_a+t_c)$.

(11) Step ST11

When each section of the rotating velocity of the actuator is set through the above-described steps, a sub-timer for measuring time with the control cycle is operated and thereby time t is measured.

(12) Step ST12

Time measured by the sub-timer is determined if it is within a range of $t_1$ at the beginning of control.

(13) Step ST13

A new desired rear wheel angle q is calculated in accordance with the above-described equation (1) during the control cycle.

(14) Step ST14

A practical rear wheel angle is measured again.

(15) Step ST15

In the controller, the desired rear wheel angle q and the practical rear wheel angel $q_0$ are compared with each other, and during this, if an error occurs, a compensating control is executed.

(16) Step ST16

The time t measured by the sub-timer and the control time $t_4$ are compared with each other. If the time t is shorter than the time $t_4$, the step ST12 is executed again. If the time t is in a range from 0 to $t_1$, the step ST13 is executed again, and if the time t is longer than the $t_1$, the step ST17 is executed again.

(17) Step ST17

The time t is determined if it is in a range from $t_1$ to $t_2$.

(18) Step ST18

A new desired rear wheel angle is calculated in accordance with the above-described equation (2).

(19) Step ST19

A practical rear wheel angle is measured again.

(20) Step ST20

In the controller, the desired rear wheel angle q and the practical rear wheel angel $q_0$ are compared with each other, and during the comparison, if an error occurs, a compensating control is executed.

Again, step ST16 is executed to compare the measured time t and the control time $t_4$ with each other. If the time t is shorter than the time $t_4$, the steps ST12 and ST17 are executed again until the time t is in a range from $t_1$ to $t_2$. After step ST16, the step ST17 is executed again until the time t is longer than the $t_2$. Afterwards, step 21 is executed.

(21) Step ST21

Time measured by the sub-timer is determined if it is within a range from $t_2$ to $t_3$.

(22) Step ST22

A new desired rear wheel angle q is calculated in accordance with the above-described equation (3).

(23) Step ST23

A practical rear wheel angle $q_0$ is measured again.

(24) Step ST24

In the controller, the desired rear wheel angle q and the practical rear wheel angel $q_0$ are compared with each other, and during this, if an error occurs, a compensating control is executed.

Again step ST16 is executed to compare the measured time t and the control time $t_4$ with each other. If the time t is shorter than the time $t_4$, the steps ST12 and ST17 are executed again until the time t is in a range from $t_2$ to $t_3$. After this, the step 17 is executed again, and when the time t is longer than the $t_3$, the step 25 is executed.

(25) Step ST25

Time measured by the sub-timer is determined if it is within a range from $t_3$ to $t_4$.

(26) Step ST26

If the condition of step ST25 is satisfied, since this means that the control of the controller is completed above the reduction section $t_c$, the control is lapsed.

Again, in the step ST16, if the time measure by the sub-timer is longer than the time $t_4$, the control is fed back to the step ST1 so that the control can be executed under a new control cycle.

The effects of the present invention will be described hereinafter with reference to FIGS. 7 to 18.

Figure 7:
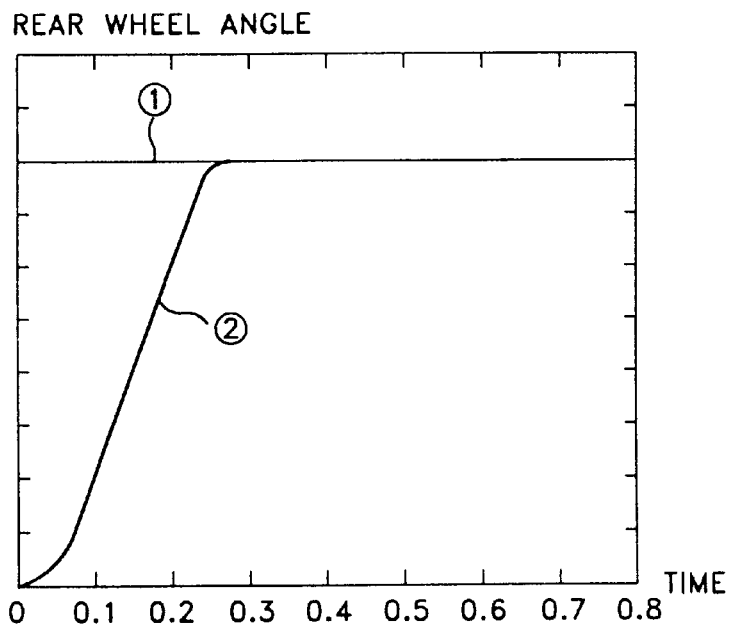
FIG. 7 is a graph illustrating a rear wheel angle control state with respect to time.

Referring to FIG. 7, in the conventional point-to-point method, the desired rear wheel angle has a constant value during a control cycle as shown in a line 1, while in the trajectory control method according to the present invention, as shown in a line 2, the desired rear wheel angle is constantly increased from 0 at an initial state to a constant desired rear wheel angle as in the point-to-point method, and is then maintained at this constant desired rear wheel angle.

Figure 8:
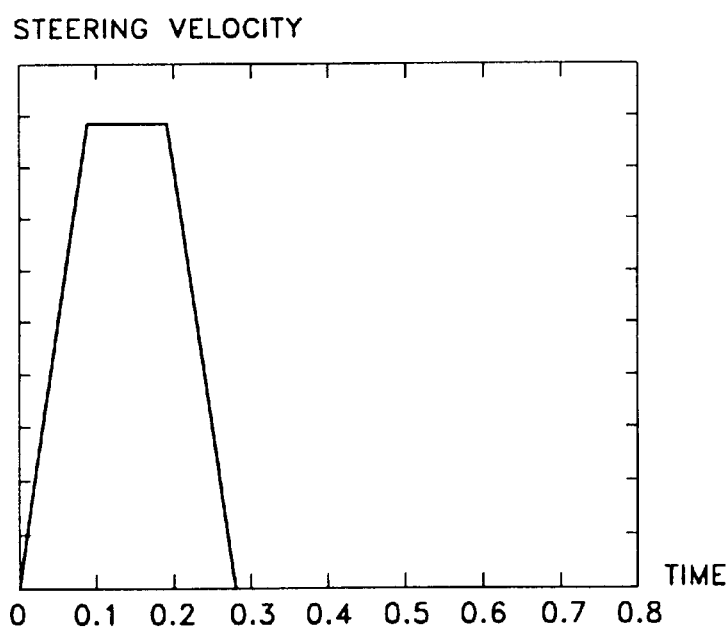
FIG. 8 is a graph illustrating a velocity trajectory control with respect to time.

Accordingly, as shown in FIG. 8 obtained by differentiating the line 2 of FIG. 7, the rotating velocity varies while having the accelerating section, the uniform velocity section, and the reduction section.

Figure 9:
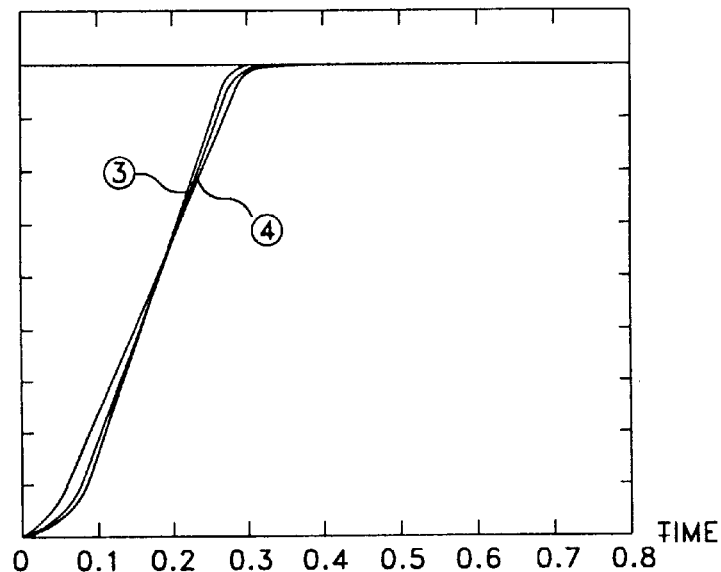

FIGS. 9 to 12 are graphs comparing responsiveness of the actuator between a conventional point-to-point method and a trajectory control method in accordance with a present invention. FIG. 9 illustrates a practical rear wheel angle with respect to time that demonstrates that a line 4 representing a responding value of the actuator has more consistent inclination than a line 3 representing that of the conventional point-to-point method.

Figure 10:
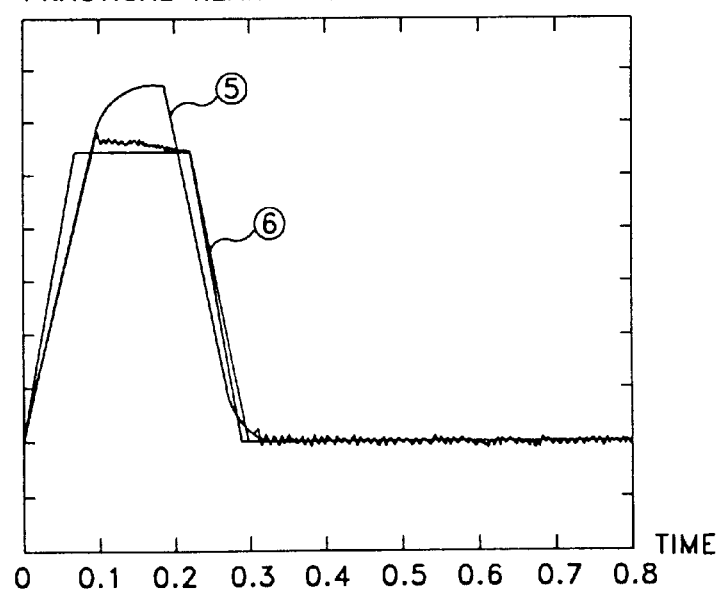

In addition, FIG. 10 illustrating a practical rear wheel angle steering velocity with respect to time shows that a line 6 representing the rear wheel angle steering velocity by the trajectory control method of the present invention is executed more thoroughly in a velocity control than a line 5 representing that of the conventional point-to-point method.

Figure 11:
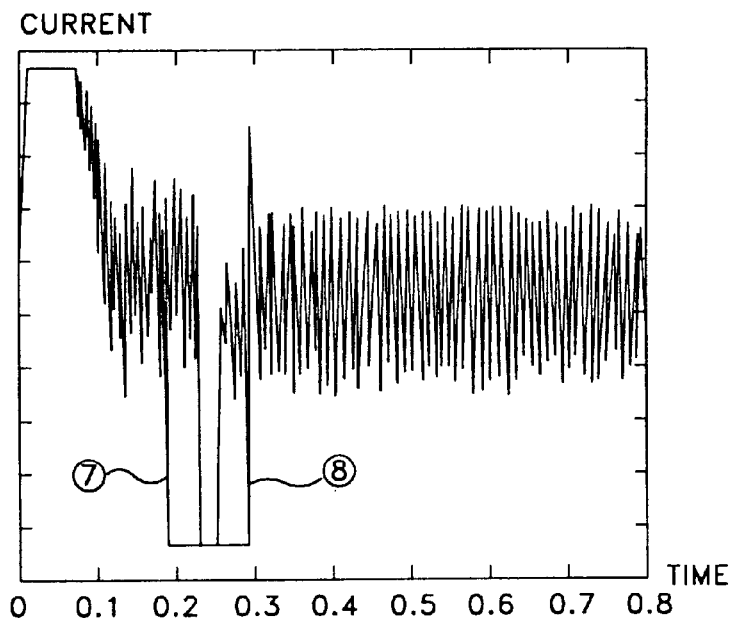

Further, FIG. 11 illustrating a current input state with respect to time shows that current phase change timing of the trajectory control method of the present invention is different from that of the conventional point-to-point method. This results from a change of direction of the current at the beginning of the speed reduction in the trajectory control method of the present invention. FIG. 11 further shows that the trajectory control method of the present invention has a feedback effect that controls the directional change timing of the current.

Figure 12:
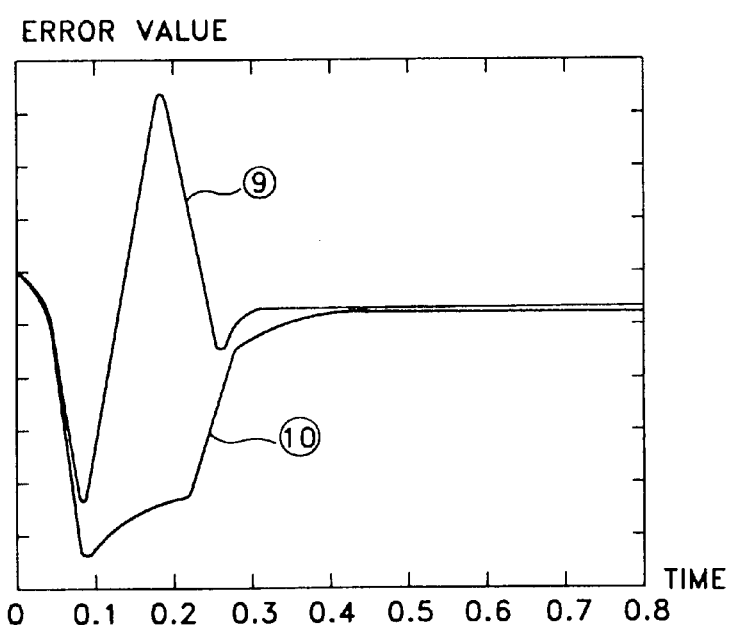

In FIG. 12 illustrating a practical rear wheel angle error value with respect to time shows that a line 10 representing an error value of the trajectory control method of the present invention achieves more stable control without over-shooting line 9 representing an error value of the conventional point-to-point method. Further, in the uniform velocity section, the error value of the present invention is more uniform than that of the conventional method.

FIGS. 13 to 18 are graphs comparing responsiveness of the controller with respect to a directional change of a compression spring between a conventional point-to-point method and a trajectory control method in accordance with a present invention.

Figure 13:
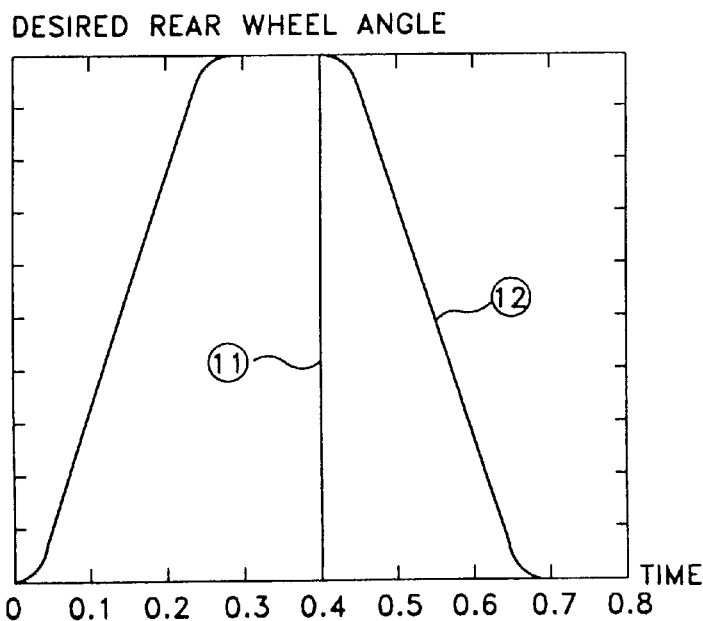
FIGS. 13 to 18 are graphs comparing responsiveness of the controller with respect to a directional change of a pre-pressure spring between a conventional point-to-point method and a trajectory control method in accordance with the present invention; where

FIG. 13 illustrating a desired rear wheel angle with respect to time shows that, as shown in a line 11 of the conventional point-to-point method, the practical rear wheel angle which is controlled by only one fixed desired rear wheel angle is set during the control cycle, while, as shown in a line 12 of the trajectory control method of the present invention, the practical rear wheel angle is continuously controlled by a desired rear wheel angle which varies according to time.

Figure 14:
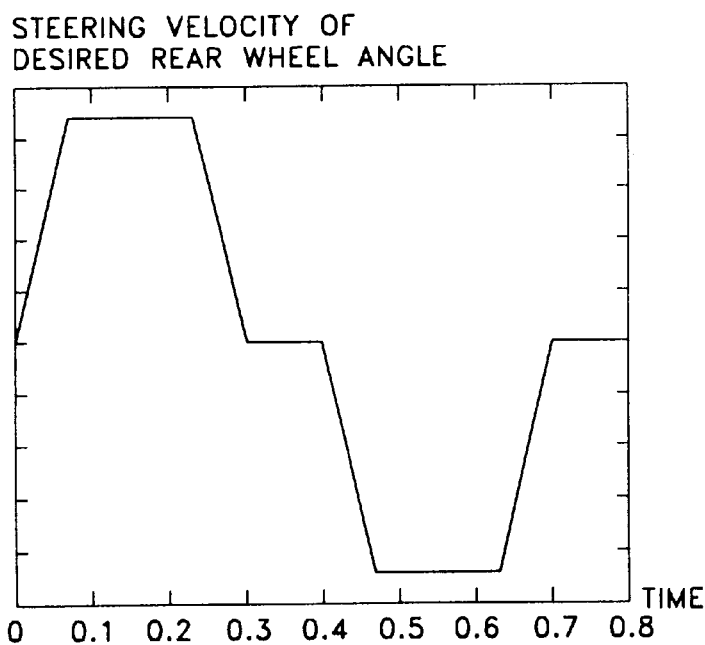

Accordingly, a desired rear wheel angle steering velocity with respect to time is varied as shown in FIG. 14.

Figure 15:
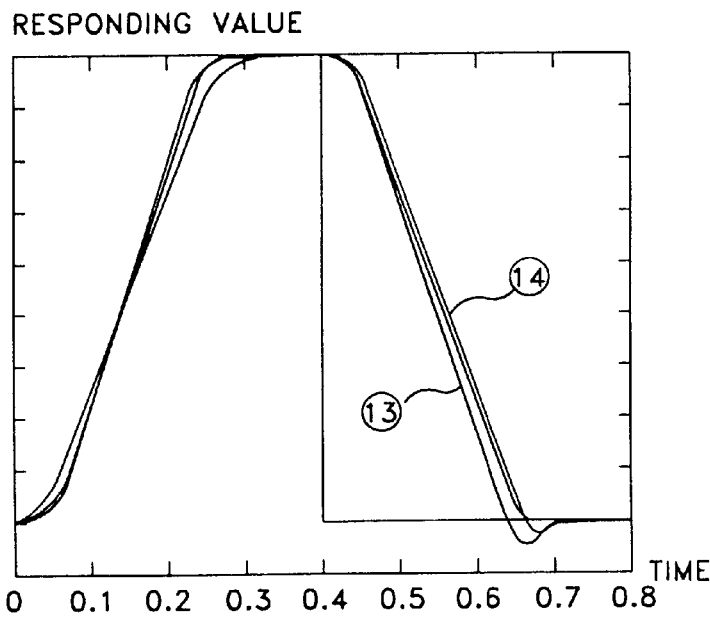

In addition, in FIG. 15 illustrating a desired rear wheel angle responding value with respect to time shows a line 13 of the conventional point-to-point method when the direction of the spring force is changed so that the over-shoot phenomenon occurs at the desired value. However, a line 14 shows that the desired value is varied with a constant inclination without the over-shoot phenomenon.

Figure 16:
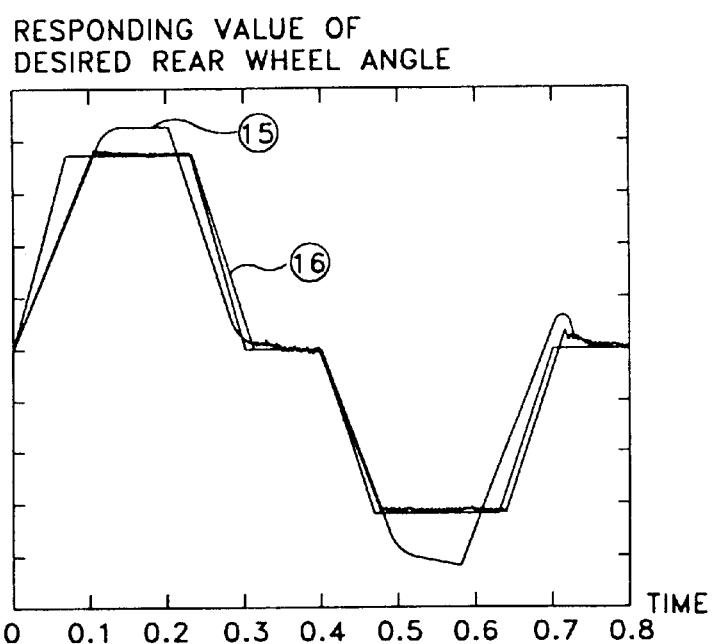

Further, in FIG. 16 illustrating a desired rear wheel angle steering velocity responding value with respect to time, a line 15 of the conventional point-to-point method shows that the desired rear wheel angle is greatly deviated from the desired value, while a line 16 of the present invention shows that the desired rear wheel angle is varied along the desired value.

Figure 17:
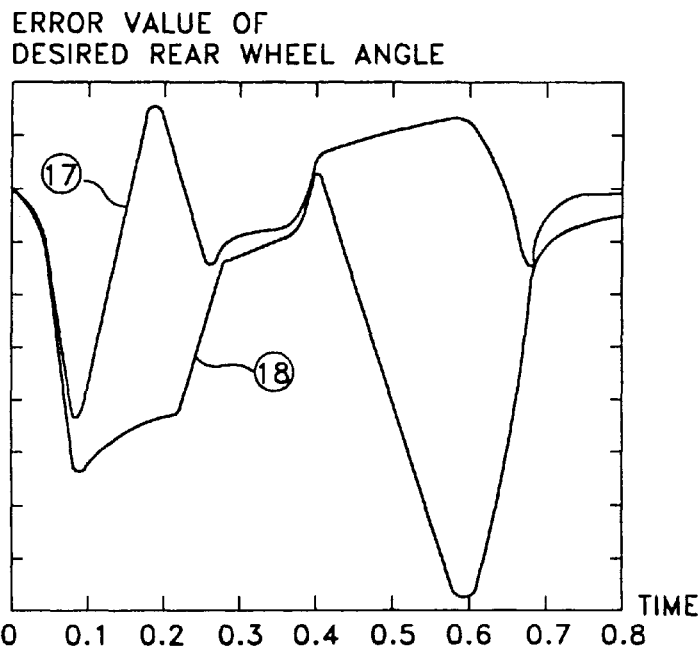

Therefore, as shown in FIG. 17 illustrating a desired rear wheel angle error value with respect to time, an error value with respect to the directional change of the spring force represented by a line 17 according to the conventional point-to-point method is less accurate than that represented by a line 18 according to the trajectory control method of the present invention.

Figure 18:
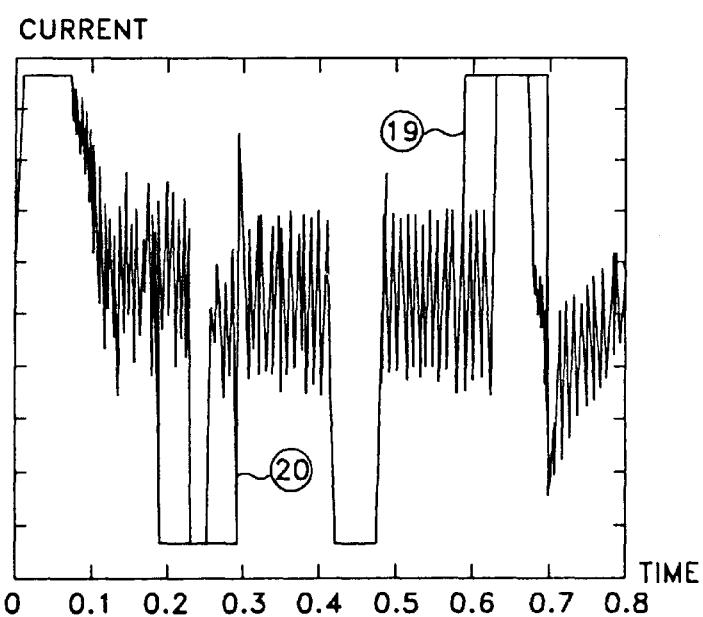

Further, as shown in FIG. 18 illustrating a current input state of a desired rear wheel angle with respect to time, responsiveness with respect to the directional change of the spring force represented by a line 20 according to the trajectory control method of the present invention is better than that represented by a line 19 according to the conventional point-to-point method.

While this invention has been described in connection with what is presently considered to be the most practical and preferred embodiments, it is to be understood that the invention is not limited to the disclosed embodiment, but, on the contrary, it is intended to cover various modifications and equivalent arrangements included within the spirit and scope of the appended claims.

What is claimed is:

1. A method for controlling a rear wheel angle of a rear wheel in a vehicular four-wheel steering system having an actuator connecting the rear wheel to said steering system, comprising the steps of:

setting a control cycle of the actuator;

dividing the control cycle into an accelerating section, a uniform velocity section, and a reduction section corresponding respectively to an accelerating rotating velocity profile, a uniform rotating velocity profile, and a decelerating rotating velocity profile of the actuator;

integrating each of the velocity profiles to establish a desired rear wheel angle for the associated section;

measuring an actual rear wheel angle during each section of the control cycle;

comparing the desired rear wheel angle to the actual rear wheel angle during each section of the control cycle; and applying a compensating control to the actuator responsive to an error value established in said comparing step.

2. A method for controlling a rear wheel angle of a four-wheel steering system for a vehicle according to claim 1, wherein each desired rear wheel angle at each section is calculated by the following equations:

in a section from an initial control to the accelerating section;

$$q = q_{10t} + (½)at_2 \tag{1}$$

in a section from the initial control to the uniform velocity section;

$$q = q_{10t} + (½)bt + (t-t_1)b \tag{2}$$

in a section from the initial control to the reduction section;

$$q = q_{10t} + bt - (a/2)[(t_3-t)_2](t_3-t_2) \tag{3}$$

wherein, q = the desired rear wheel angle $q_{10}$ = a practical rear wheel angle calculated at the initial control a = acceleration at the accelerating section b = a uniform velocity at the uniform velocity section t = time $t_1$ = time from the initial control to the accelerating section $t_2$ = time from the initial control to the uniform velocity section $t_3$ = time from the initial control to the reduction section.

* * * * *